US012685366B1

(12) United States Patent
Shiao

(10) Patent No.: US 12,685,366 B1
(45) Date of Patent: Jul. 21, 2026

(54) METHOD FOR MANUFACTURING SHOE BODY WITH FOAMED DUAL-LAYER MIDSOLE FORMED BY SUPERCRITICAL FOAMING INJECTION MOLDING AND SHOE BODY WITH FOAMED DUAL-LAYER MIDSOLE FORMED BY SUPERCRITICAL FOAMING INJECTION MOLDING

(71) Applicant: Grand Force Co., Ltd., Taichung City (TW)

(72) Inventor: Jui-Fen Shiao, Taichung City (TW)

(73) Assignee: Grand Force Co., Ltd., Taichung City (TW)

( * ) Notice: Subject to any disclaimer, the term of this patent is extended or adjusted under 35 U.S.C. 154(b) by 0 days.

(21) Appl. No.: 19/278,826

(22) Filed: Jul. 24, 2025

(30) Foreign Application Priority Data

May 12, 2025 (TW) ................................. 114117728

(51) Int. Cl.
| | |
|---|---|
| *B29C 45/14* | (2006.01) |
| *A43B 13/12* | (2006.01) |
| *B29D 35/14* | (2010.01) |
| *B29L 31/50* | (2006.01) |

(52) U.S. Cl.
CPC ...... *A43B 13/125* (2013.01); *B29C 45/14795* (2013.01); *B29D 35/142* (2013.01); *B29L 2031/504* (2013.01)

(58) Field of Classification Search
CPC ............ A43B 13/125; B29C 45/14795; B29D 35/142; B29L 2031/504
USPC ........................................................ 156/242
See application file for complete search history.

(56) References Cited

U.S. PATENT DOCUMENTS

| | | | |
|---|---|---|---|
| 12,569,031 B2 * | 3/2026 | Donovan | ............. A43B 13/127 |
| 2026/0021611 A1 * | 1/2026 | Huang | ................ B29C 44/0415 |

* cited by examiner

*Primary Examiner* — James D Sells
(74) *Attorney, Agent, or Firm* — Apex Juris, pllc; Cera Oh

(57) ABSTRACT

A method for manufacturing a shoe body with a foamed dual-layer midsole formed by supercritical foaming injection molding includes: providing a first midsole module including an upper mold and a first midsole mold, wherein an upper, sleeved onto a shoe last, is pre-disposed in the upper mold; sealing the first midsole mold to the upper mold to form a first midsole mold chamber; injecting a first foaming material into the first midsole mold chamber to form a first foamed midsole layer bonded to the upper; opening the upper mold and the first midsole mold; providing a second midsole module including a second midsole mold; sealing the second midsole mold to the upper mold to form a second midsole mold chamber; injecting a second foaming material into the second midsole mold chamber to form a second foamed midsole layer bonded to the first foamed midsole layer, thereby obtaining the shoe body.

14 Claims, 8 Drawing Sheets

Figure 1:
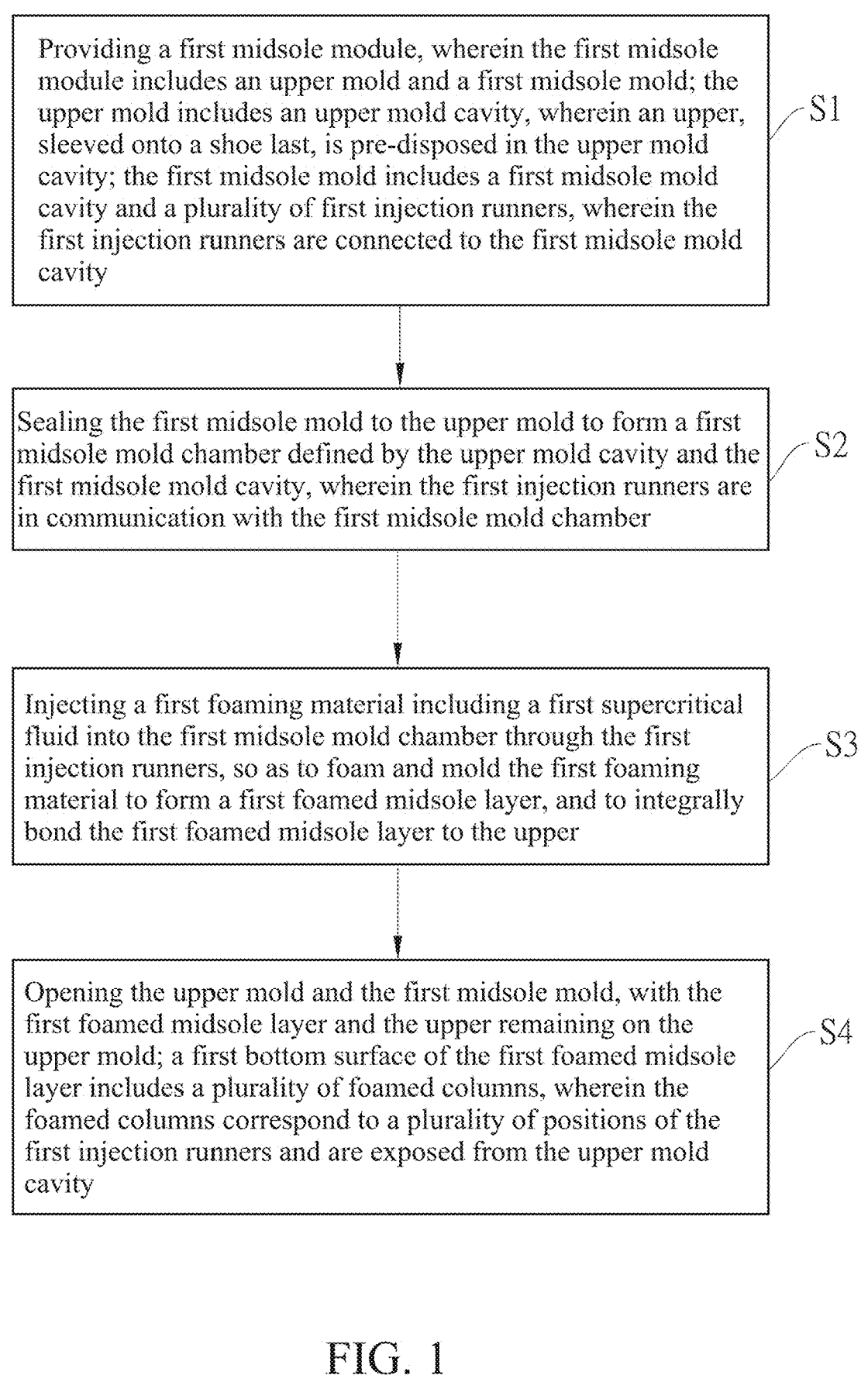

Providing a first midsole module, wherein the first midsole module includes an upper mold and a first midsole mold; the upper mold includes an upper mold cavity, wherein an upper, sleeved onto a shoe last, is pre-disposed in the upper mold cavity; the first midsole mold includes a first midsole mold cavity and a plurality of first injection runners, wherein the first injection runners are connected to the first midsole mold cavity

S1

Sealing the first midsole mold to the upper mold to form a first midsole mold chamber defined by the upper mold cavity and the first midsole mold cavity, wherein the first injection runners are in communication with the first midsole mold chamber

S2

Injecting a first foaming material including a first supercritical fluid into the first midsole mold chamber through the first injection runners, so as to foam and mold the first foaming material to form a first foamed midsole layer, and to integrally bond the first foamed midsole layer to the upper

S3

Opening the upper mold and the first midsole mold, with the first foamed midsole layer and the upper remaining on the upper mold; a first bottom surface of the first foamed midsole layer includes a plurality of foamed columns, wherein the foamed columns correspond to a plurality of positions of the first injection runners and are exposed from the upper mold cavity

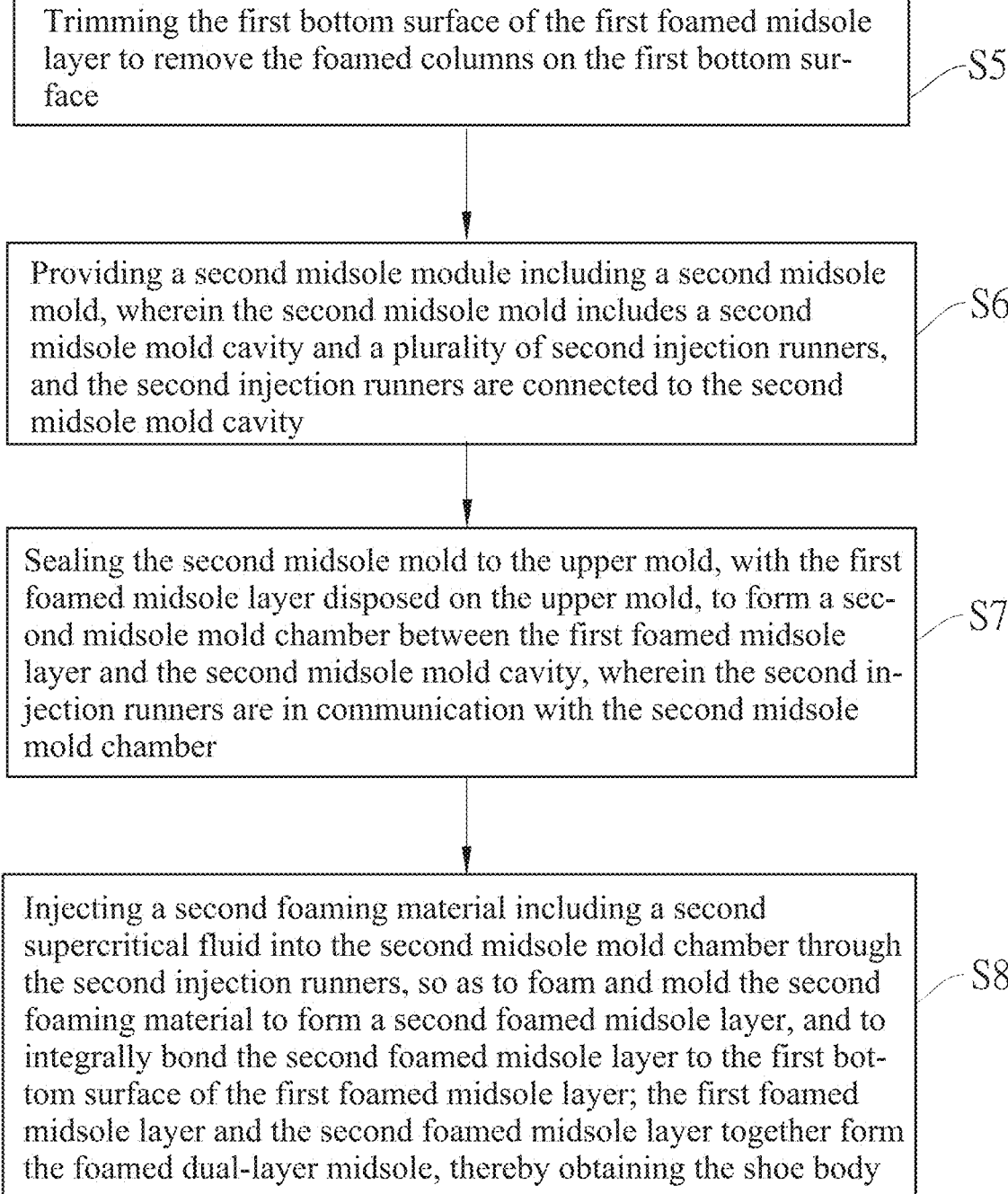

Trimming the first bottom surface of the first foamed midsole layer to remove the foamed columns on the first bottom surface — S5

Providing a second midsole module including a second midsole mold, wherein the second midsole mold includes a second midsole mold cavity and a plurality of second injection runners, and the second injection runners are connected to the second midsole mold cavity — S6

Sealing the second midsole mold to the upper mold, with the first foamed midsole layer disposed on the upper mold, to form a second midsole mold chamber between the first foamed midsole layer and the second midsole mold cavity, wherein the second injection runners are in communication with the second midsole mold chamber — S7

Injecting a second foaming material including a second supercritical fluid into the second midsole mold chamber through the second injection runners, so as to foam and mold the second foaming material to form a second foamed midsole layer, and to integrally bond the second foamed midsole layer to the first bottom surface of the first foamed midsole layer; the first foamed midsole layer and the second foamed midsole layer together form the foamed dual-layer midsole, thereby obtaining the shoe body — S8

METHOD FOR MANUFACTURING SHOE BODY WITH FOAMED DUAL-LAYER MIDSOLE FORMED BY SUPERCRITICAL FOAMING INJECTION MOLDING AND SHOE BODY WITH FOAMED DUAL-LAYER MIDSOLE FORMED BY SUPERCRITICAL FOAMING INJECTION MOLDING

BACKGROUND OF THE INVENTION

Technical Field

The present invention relates generally to a technique of manufacturing a shoe body, and more particularly to a method for manufacturing a shoe body with a foamed dual-layer midsole formed by supercritical foaming injection molding and the shoe body with the foamed dual-layer midsole formed by supercritical foaming injection molding.

Description of Related Art

In the current conventional shoe manufacturing process, an upper, a midsole, and an outsole are separately produced. Surface treatment is then manually performed on the upper, the midsole, and the outsole. Subsequently, the upper and the outsole are respectively bonded to opposite sides of the midsole using an adhesive, thereby forming a shoe body.

However, in the current conventional shoe manufacturing process, the midsole is typically formed using a separate mold to injection-mold a single-layer foamed structure. The single-layer foamed midsole is then bonded to the upper. Since the single-layer foamed midsole is generally made from a foamed material with uniform physical properties, it cannot be integrally formed with multiple material configurations tailored to different product requirements. Although certain manufacturers have developed dual-layer midsole structures, these are usually manufactured by independently producing two separate foamed midsoles and then bonding them together to form the dual-layer midsole. Because the dual-layer midsole is not integrally formed, and because traditional shoe manufacturing requires labor-intensive steps such as adhesive application and sole attachment, the overall process efficiency is reduced. Furthermore, the chemical adhesives used during bonding might pose health risks to workers.

In addition, the bonding strength of conventional dual-layer midsole structures is often inadequate. When a wearer engages in high-intensity activities over an extended period, separation might occur between the two foamed midsoles of the dual-layer midsole, as well as between the dual-layer midsole and the upper. This separation could easily lead to sports-related injuries.

BRIEF SUMMARY OF THE INVENTION

In view of the above, the primary objective of the present invention is to provide a method for manufacturing a shoe body with a foamed dual-layer midsole formed by supercritical foaming injection molding and the shoe body with the foamed dual-layer midsole formed by supercritical foaming injection molding. The method forms the foamed dual-layer midsole structure through a continuous supercritical foaming injection process. The foamed dual-layer midsole is integrally bonded to the upper. The foamed dual-layer midsole is formed as an integral structure without an adhesive layer, thereby enhancing overall manufacturing efficiency and the strength of the shoe body.

The inventive subject matter provides the method for manufacturing the shoe body with the foamed dual-layer midsole formed by supercritical foaming injection molding. The shoe body includes the foamed dual-layer midsole and an upper bonded to each other. The method includes the following steps.

Step S1: providing a first midsole module, wherein the first midsole module includes an upper mold and a first midsole mold. The upper mold includes an upper mold cavity, wherein the upper, sleeved onto a shoe last, is pre-disposed in the upper mold cavity. The first midsole mold includes a first midsole mold cavity and a plurality of first injection runners, wherein the first injection runners are connected to the first midsole mold cavity.

Step S2: sealing the first midsole mold to the upper mold to form a first midsole mold chamber defined by the upper mold cavity and the first midsole mold cavity, wherein the first injection runners are in communication with the first midsole mold chamber.

Step S3: injecting a first foaming material including a first supercritical fluid into the first midsole mold chamber through the first injection runners, so as to foam and mold the first foaming material to form a first foamed midsole layer, and to integrally bond the first foamed midsole layer to the upper.

Step S4: opening the upper mold and the first midsole mold, with the first foamed midsole layer and the upper remaining on the upper mold; a first bottom surface of the first foamed midsole layer includes a plurality of foamed columns, wherein the foamed columns correspond to a plurality of positions of the first injection runners and are exposed from the upper mold cavity;

Step S5: trimming the first bottom surface of the first foamed midsole layer to remove the foamed columns on the first bottom surface;

Step S6: providing a second midsole module including a second midsole mold, wherein the second midsole mold includes a second midsole mold cavity and a plurality of second injection runners, and the second injection runners are connected to the second midsole mold cavity;

Step S7: sealing the second midsole mold to the upper mold, with the first foamed midsole layer disposed on the upper mold, to form a second midsole mold chamber between the first foamed midsole layer and the second midsole mold cavity, wherein the second injection runners are in communication with the second midsole mold chamber; and Step S8: injecting a second foaming material including a second supercritical fluid into the second midsole mold chamber through the second injection runners, so as to foam and mold the second foaming material to form a second foamed midsole layer, and to integrally bond the second foamed midsole layer to the first bottom surface of the first foamed midsole layer; the first foamed midsole layer and the second foamed midsole layer together form the foamed dual-layer midsole, thereby obtaining the shoe body.

The inventive subject matter further provides the shoe body with the foamed dual-layer midsole formed by supercritical foaming injection molding including a foamed dual-layer midsole and an upper. The foamed dual-layer midsole includes a first foamed midsole layer and a second foamed midsole layer, wherein the first foamed midsole layer includes a first top surface and a first bottom surface, and the second foamed midsole layer includes a second top surface and a second bottom surface. The second top surface is bonded to the first bottom surface. The upper is bonded to the foamed dual-layer midsole, wherein the upper includes a bottom surface bonded to the first top surface of the first foamed midsole layer.

The method for manufacturing the shoe body with the foamed dual-layer midsole formed by supercritical foaming injection molding adopts a two-stage supercritical foaming injection process. First, the first foamed midsole layer is formed by injection molding using the first midsole module, and the first foamed midsole layer is directly bonded to the upper. Subsequently, the first midsole mold of the first midsole module is replaced with the second midsole mold of the second midsole module, which is sealable to the upper mold. The second foaming material is then injected into the second midsole mold chamber to form the second foamed midsole layer. The first foamed midsole layer and the second foamed midsole layer could be integrally bonded to form the foamed dual-layer midsole. Thereby, reducing a number of mold setups and changes, saving adhesive application and bonding steps and costs, and improving overall process efficiency.

In the shoe body with the foamed dual-layer midsole formed by supercritical foaming injection molding, the foamed dual-layer midsole is bonded to the upper. The foamed dual-layer midsole is formed as an integral structure, with no adhesive layer between the first foamed midsole layer and the upper, or between the first foamed midsole layer and the second foamed midsole layer, thereby enhancing the structural strength of the shoe body. The first foamed midsole layer and the second foamed midsole layer could be designed with different densities, colors, hardness levels, and materials according to specific requirements, allowing their physical and functional properties to be interchangeably configured for various applications, while also enhancing the overall aesthetic appearance of the foamed dual-layer midsole.

BRIEF DESCRIPTION OF THE SEVERAL VIEWS OF THE DRAWINGS

The present invention will be best understood by referring to the following detailed description of some illustrative embodiments in conjunction with the accompanying drawings, in which FIG. 1 is a flowchart of the method for manufacturing the shoe body with the foamed dual-layer midsole formed by supercritical foaming injection molding according to an embodiment of the present invention, showing step S1 to step S4 of the method;

FIG. 2 is a flowchart of the method for manufacturing the shoe body with the foamed dual-layer midsole formed by supercritical foaming injection molding according to the embodiment of the present invention, showing step S5 to step S8 of the method;

DETAILED DESCRIPTION OF THE INVENTION

Figure 3:
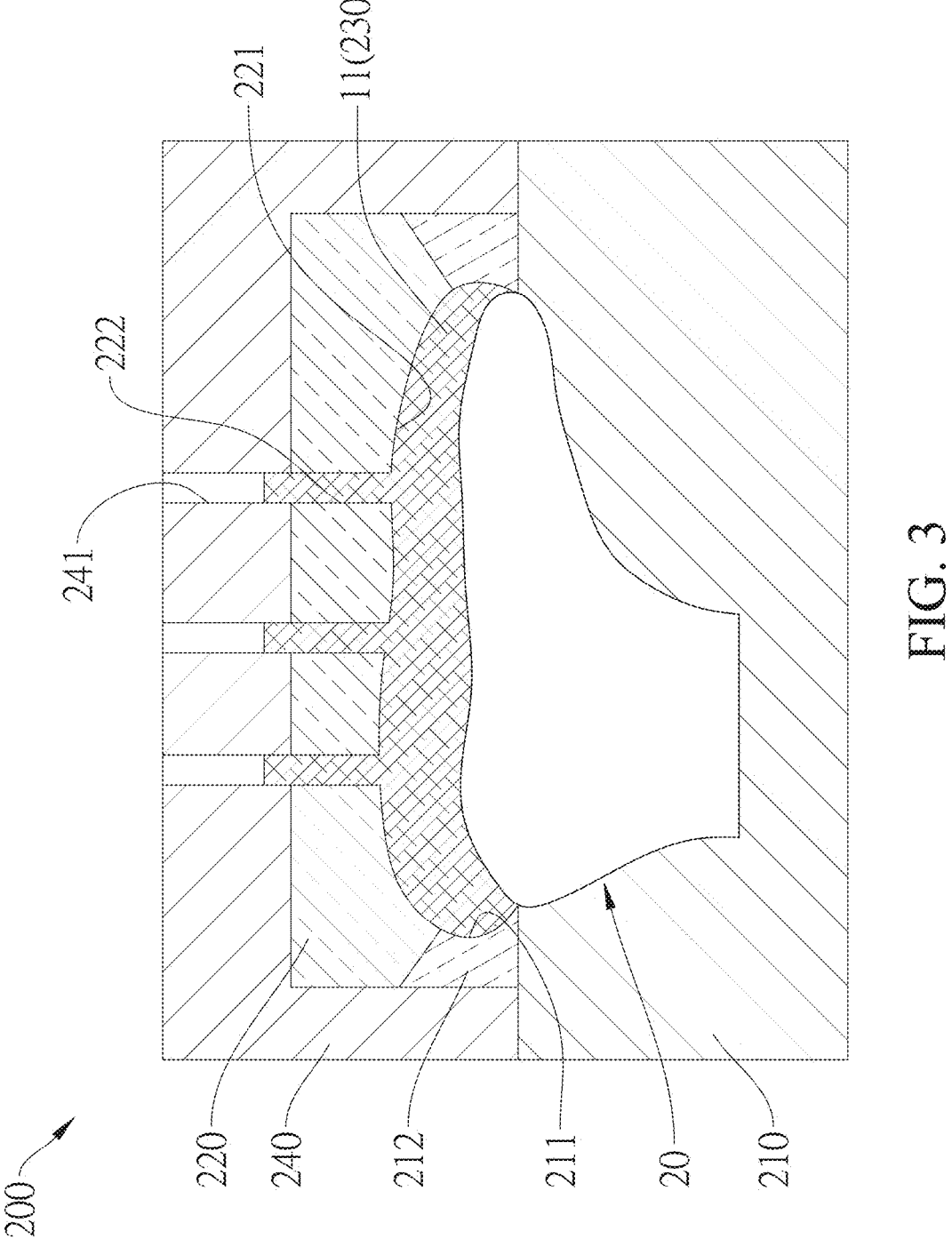
FIG. 3 is a sectional schematic view of the method for manufacturing the shoe body with the foamed dual-layer midsole formed by supercritical foaming injection molding according to the embodiment of the present invention, showing that the first foaming material is injected into the first midsole module.
Figure 4:
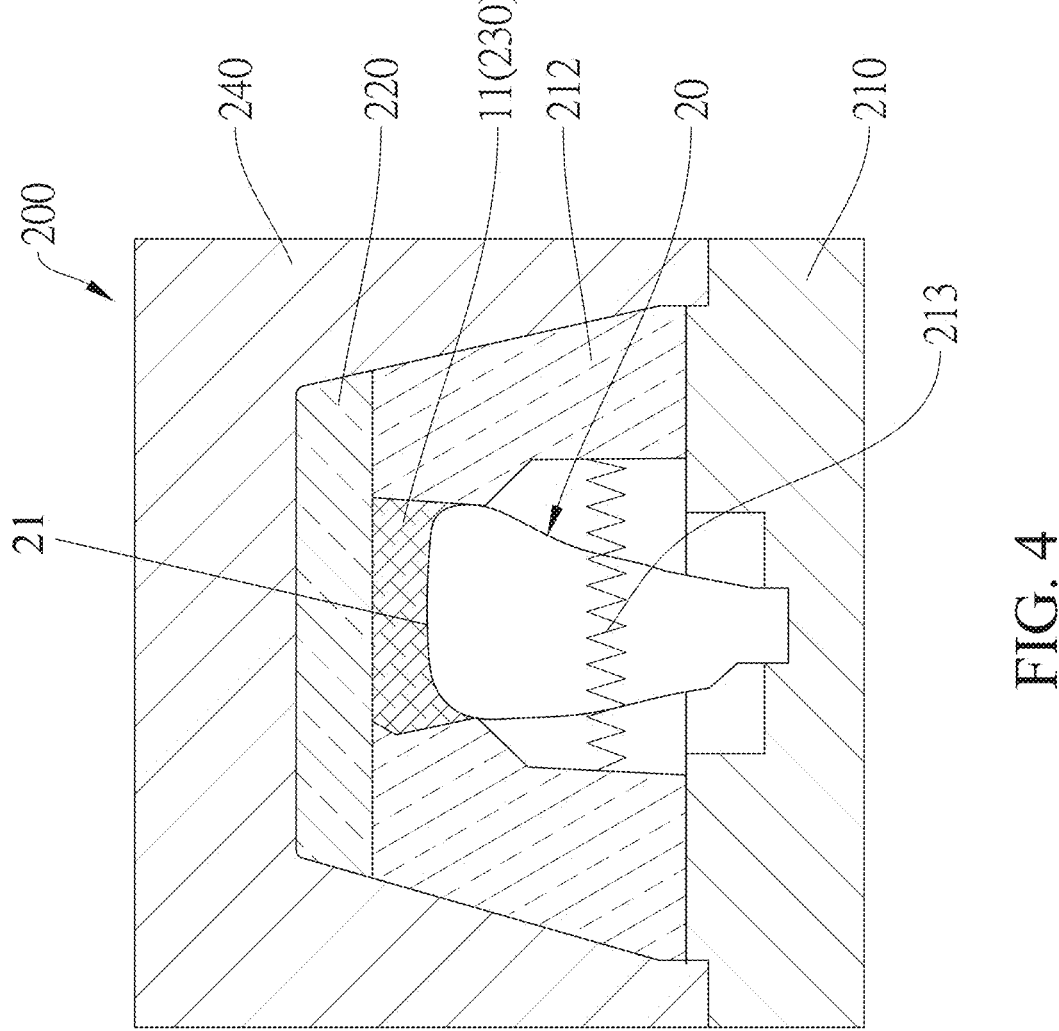
FIG. 4 is a sectional schematic view of the method for manufacturing the shoe body with the foamed dual-layer midsole formed by supercritical foaming injection molding seen from another perspective according to the embodiment of the present invention, showing that the first midsole mold is sealed to the upper mold.
Figure 8:
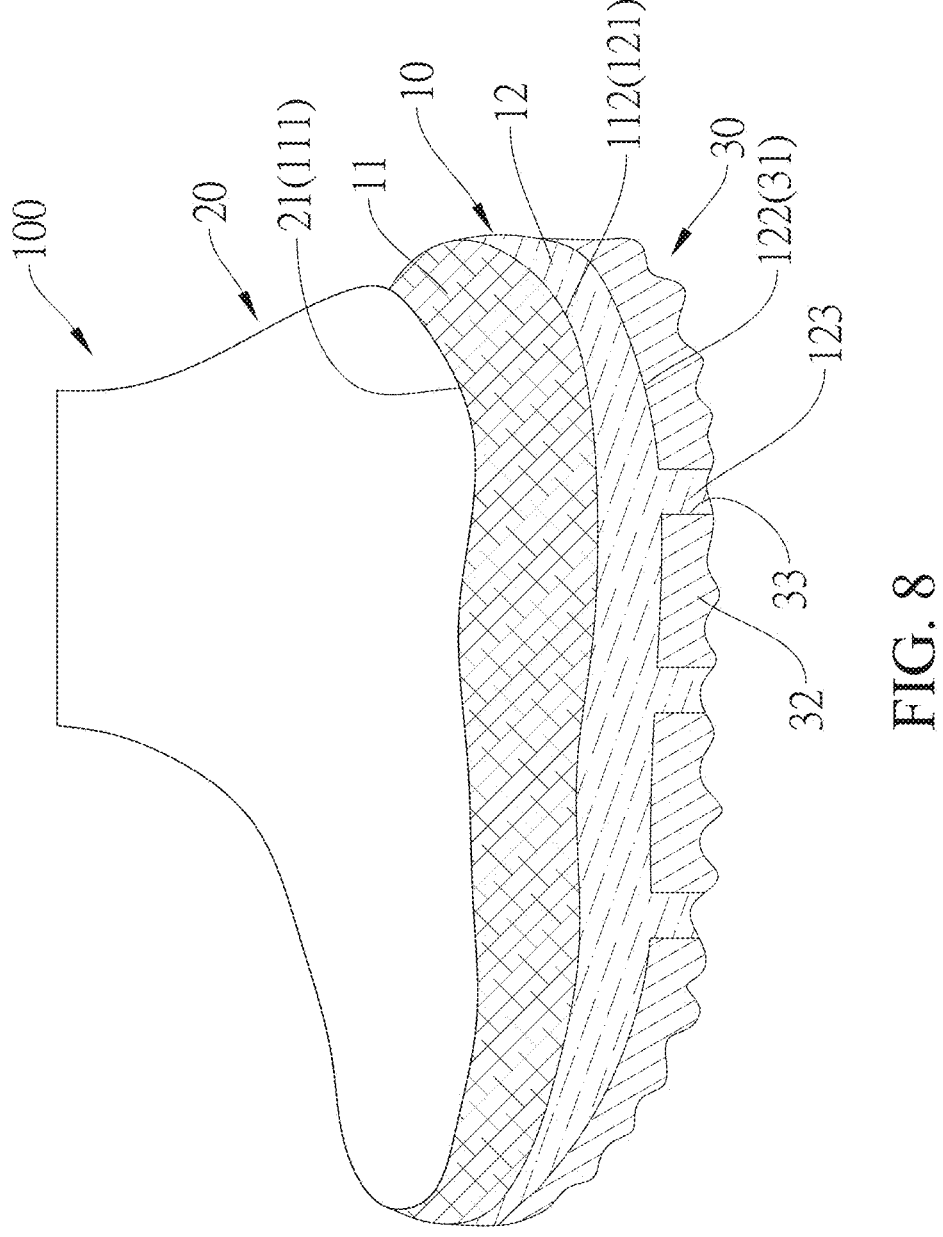
FIG. 8 is a side view of the shoe body with the foamed dual-layer midsole formed by supercritical foaming injection molding according to another embodiment of the present invention.

As illustrated in FIG. 1 and FIG. 2, a method for manufacturing a shoe body with a foamed dual-layer midsole formed by supercritical foaming injection molding, according to an embodiment of the present invention, is configured to manufacture the shoe body 100. As shown in FIG. 8, in the current embodiment, the shoe body 100 includes a foamed dual-layer midsole 10 and an upper 20, wherein the foamed dual-layer midsole 10 is combined with the upper 20. The method for manufacturing the shoe body with the foamed dual-layer midsole formed by supercritical foaming injection molding includes the following steps:

Step S1: providing a first midsole module 200. As shown in FIG. 3, the first midsole module 200 includes an upper mold 210 and a first midsole mold 220. The upper mold 210 includes an upper mold cavity 211, wherein the upper 20, sleeved onto a shoe last, is pre-disposed in the upper mold cavity 211. As shown in FIG. 3 and FIG. 4, in the current embodiment, two clamping blocks 212 are disposed on the upper mold 210, and a spring 213 is connected between the two clamping blocks 212. When the upper 20, sleeved onto the shoe last, is disposed on the upper mold 210, the two clamping blocks 212 are relatively movable and contact two sides of a bottom surface 21 of the upper 20. Therefore, the upper 20 is fixed in the upper mold cavity 211, and the upper mold cavity 211 is located between the two clamping blocks 212. The spring 213 normally applies a pushing force to the two clamping blocks 212, but is not limited to this configuration. In other embodiments, the spring 213 might be omitted, and the two clamping blocks 212 might also be opened and closed by an electric mechanism. The first midsole mold 220 includes a first midsole mold cavity 221 and a plurality of first injection runners 222, wherein the first injection runners 222 are connected to the first midsole mold cavity 221.

Step S2: sealing the first midsole mold 220 to the upper mold 210 to form a first midsole mold chamber 230 defined by the upper mold cavity 211 and the first midsole mold cavity 221. The first injection runners 222 are in communication with the first midsole mold chamber 230. As shown in FIG. 3 and FIG. 4, in the current embodiment, the first midsole module 200 includes a first mold cover 240, wherein the first mold cover 240 includes a plurality of first feeding holes 241. Sealing the first midsole mold 220 to the upper mold 210 includes: first disposing the first midsole mold 220 on the two clamping blocks 212, then placing the first mold cover 240 over a periphery of the first midsole mold 220 and a periphery of the two clamping blocks 212, and finally sealing the first mold cover 240 to the upper mold 210. At this time, the two clamping blocks 212 are pushed against the upper 20 by being pressed by the first mold cover 240, and the two clamping blocks 212 simultaneously compress the spring 213. The first feeding holes 241 are in communication with the first injection runners 222 of the first midsole mold 220. Therefore, the first feeding holes 241 and the first injection runners 222 are in communication with the first midsole mold chamber 230.

Step S3: injecting a first foaming material including a first supercritical fluid into the first midsole mold chamber 230 through the first injection runners 222, so as to foam and mold the first foaming material to form a first foamed midsole layer 11 in the first midsole mold chamber 230, and to integrally bond the first foamed midsole layer 11 to the upper 20. More specifically, when the first foaming material foams and molds to form the first foamed midsole layer 11, the first foamed midsole layer 11 is bonded to the bottom surface 21 of the upper 20 by thermal fusion, without including an adhesive layer between the first foamed midsole layer 11 and the upper 20. The first foaming material is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof. The first supercritical fluid might be nitrogen or carbon dioxide, and an injection screw temperature of the first foaming material ranges from 100° C. to 300° C. In the current embodiment, setting a first gas pressure value within the first midsole mold chamber 230 before injecting the first foaming material into the first midsole mold chamber 230, with the first gas pressure value ranges from 0 to 40 bar. When the first gas pressure value is greater than 0, the first gas pressure within the first midsole mold chamber 230 is released after the injection of the first foaming material, allowing the first foaming material to foam and form the first foamed midsole layer 11 within the first midsole mold chamber 230. Preferably, the first gas pressure value ranges from 5 to 35 bar, but is not limited to this range.

Figure 5:
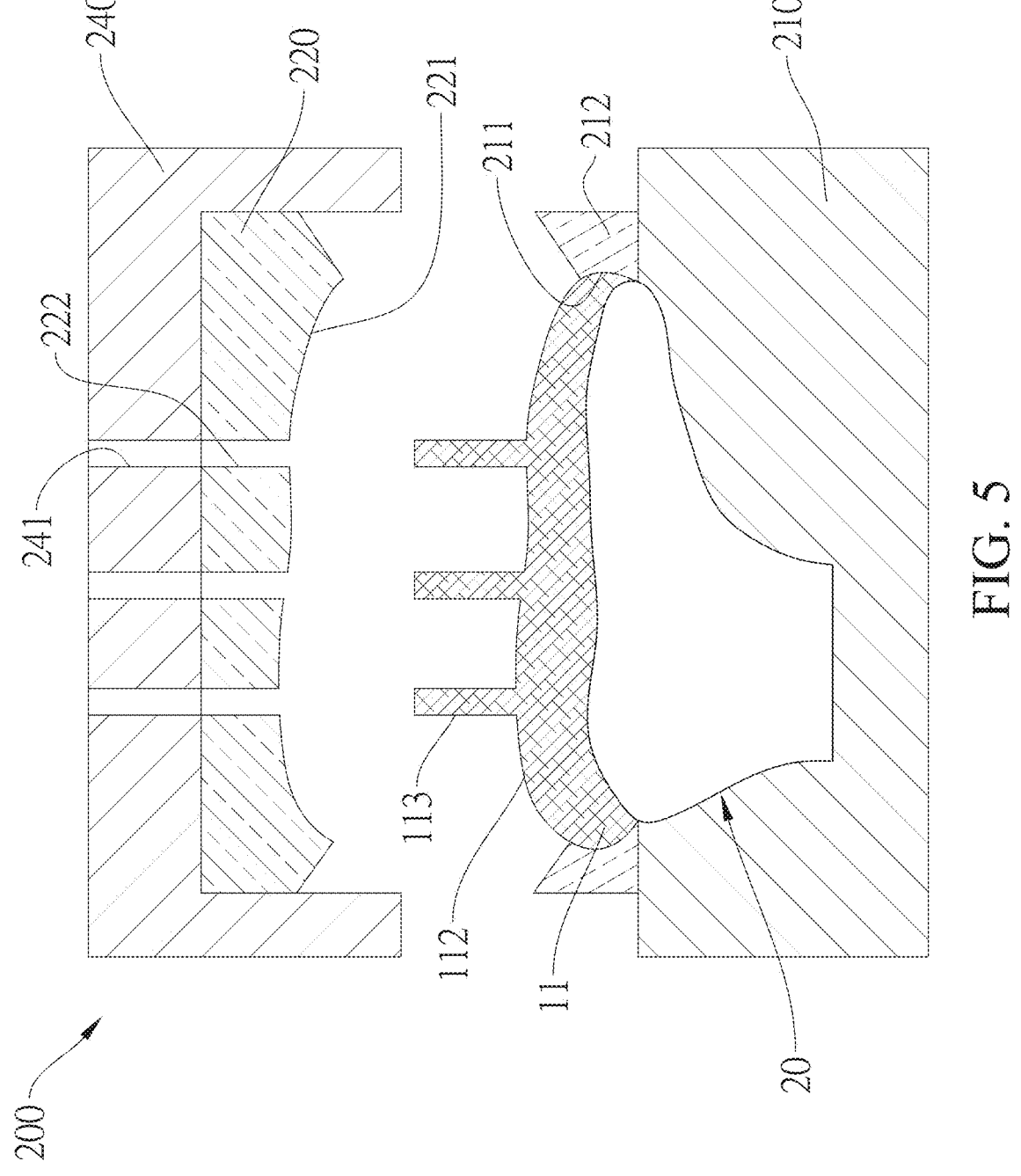
FIG. 5 is a sectional schematic view of the method for manufacturing the shoe body with the foamed dual-layer midsole formed by supercritical foaming injection molding according to the embodiment of the present invention, showing that the first foamed midsole layer is obtained by opening the first midsole module from the upper mold.

Step S4: opening the upper mold 210 and the first midsole mold 220. Specifically, as shown in FIG. 5, detaching the first mold cover 240 and the first midsole mold 220 from the upper mold 210 to release the constraint on the two clamping blocks 212, thereby allowing the spring 213 to resume pushing the two clamping blocks 212 and then releasing the pressure applied by the clamping blocks 212 to the upper 20. Meanwhile, the first foamed midsole layer 11 and the upper 20 remain on the upper mold 210, and a first bottom surface 112 of the first foamed midsole layer 11 includes a plurality of foamed columns 113. The foamed columns 113 correspond to a plurality of positions of the first injection runners 222 and are exposed from the upper mold cavity 211.

Figure 6:
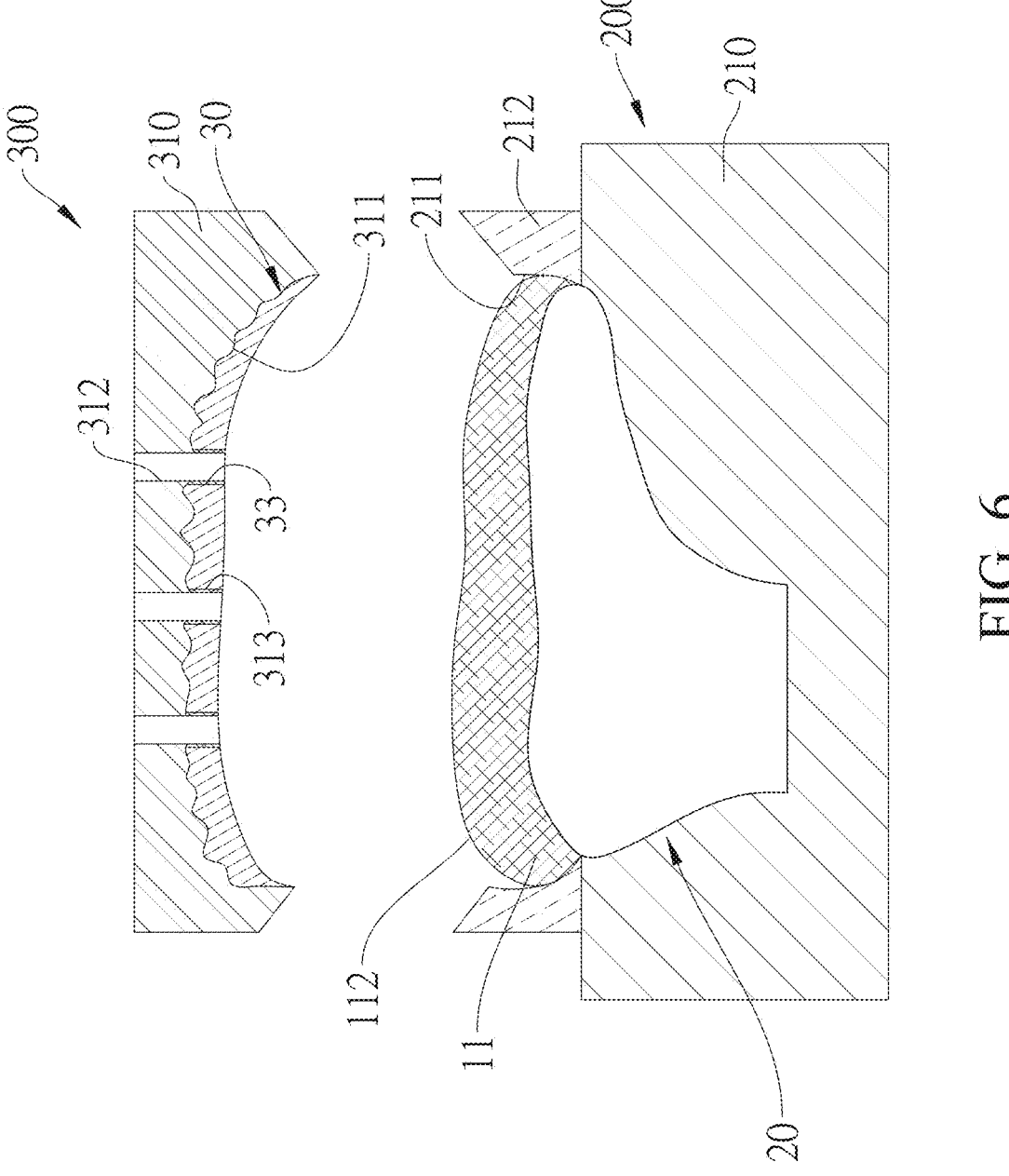
FIG. 6 is a sectional schematic view of the method for manufacturing the shoe body with the foamed dual-layer midsole formed by supercritical foaming injection molding according to the embodiment of the present invention, showing the second midsole module.

Step S5: as shown in FIG. 6, trimming the first bottom surface 112 of the first foamed midsole layer 11 to remove the foamed columns 113 on the first bottom surface 112, so that the first bottom surface 112 of the first foamed midsole layer 11 becomes flat.

Step S6: providing a second midsole module 300 including a second midsole mold 310. The second midsole mold 310 includes a second midsole mold cavity 311 and a plurality of second injection runners 312. The second injection runners 312 are connected to the second midsole mold cavity 311. As shown in FIG. 6, in the current embodiment, an outsole 30 is pre-disposed in the second midsole mold cavity 311 of the second midsole mold 310. The outsole 30 is selected from a group consisting of rubber, thermoplastic polyurethane elastomer (TPU), thermoplastic polyester elastomer (TPEE), thermoplastic vulcanizate (TPV), and a combination thereof. A plurality of protruding tubes 313 are disposed within the second midsole mold cavity 311, and protrude at a plurality of positions corresponding to the second injection runners 312. A plurality of through holes 33 are disposed on the outsole 30 and are respectively sleeved onto the protruding tubes 313, thereby positioning the outsole 30 within the second midsole mold cavity 311. However, the present disclosure is not limited thereto.

Figure 7:
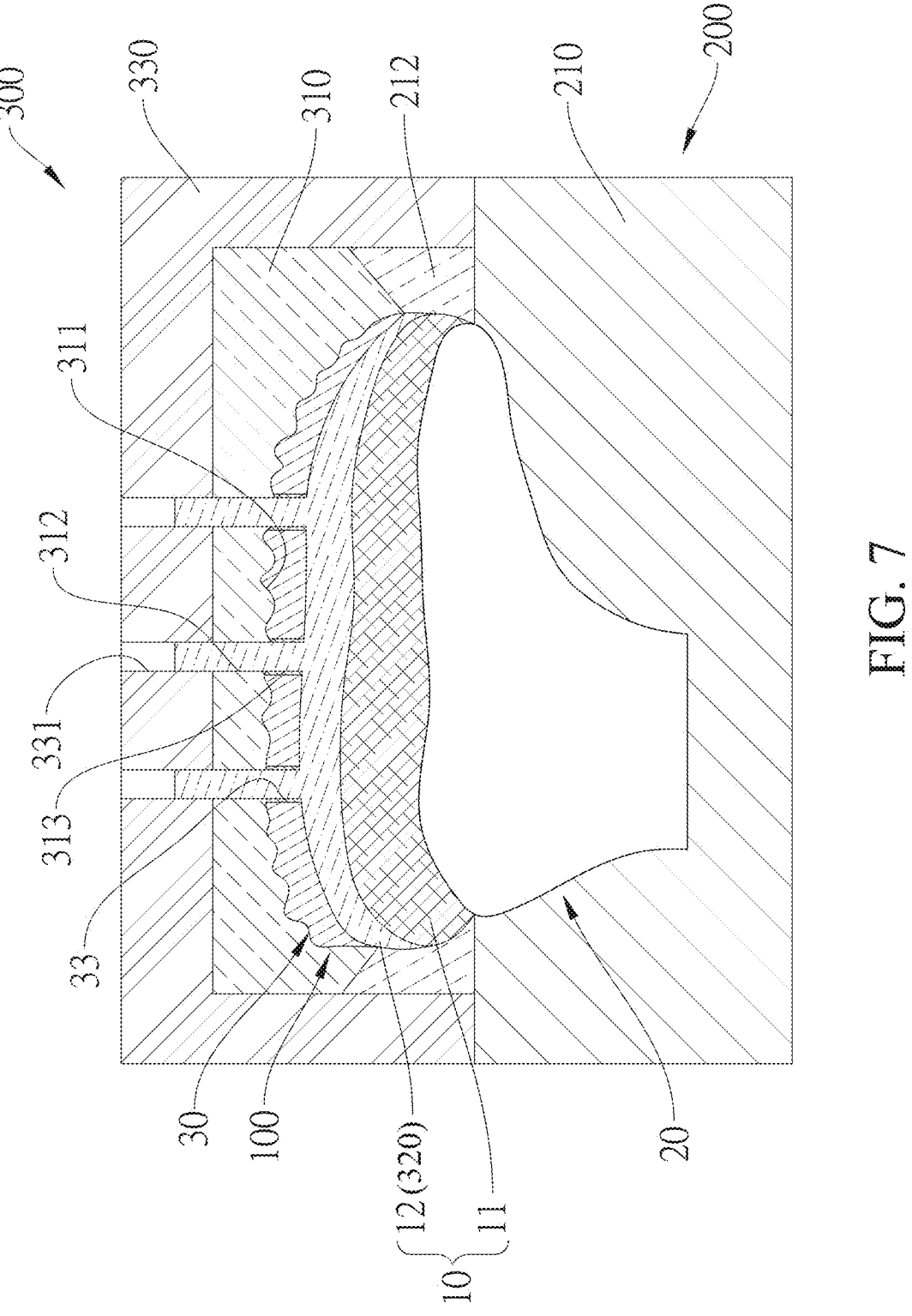
FIG. 7 is a sectional schematic view of the method for manufacturing the shoe body with the foamed dual-layer midsole formed by supercritical foaming injection molding according to the embodiment of the present invention, showing that the second foaming material is injected into the second midsole mold chamber.

Step S7: sealing the second midsole mold 310 to the upper mold 210, with the first foamed midsole layer 11 disposed on the upper mold 210, to form a second midsole mold chamber 320 between the first foamed midsole layer 11 and the second midsole mold cavity 311, wherein the second injection runners 312 are in communication with the second midsole mold chamber 320. As shown in FIG. 6 and FIG. 7, the second midsole module 300 includes a second mold cover 330, wherein the second mold cover 330 includes a plurality of second feeding holes 331. Sealing the second midsole mold 310 to the upper mold 210 includes: first disposing the second midsole mold 310 on the two clamping blocks 212, with the outsole 30 facing the first bottom surface 112 of the first foamed midsole layer 11; then placing the second mold cover 330 over a periphery of the second midsole mold 310 and the periphery of the two clamping blocks 212; and finally sealing the second mold cover 330 to the upper mold 210. At this time, the two clamping blocks 212 are pushed against the upper 20 by being pressed by the second mold cover 330, and the second midsole mold chamber 320 is located between the outsole 30 and the first foamed midsole layer 11. The second feeding holes 331 are in communication with the second injection runners 312 of the second midsole mold 310, and the second feeding holes 331 and the second injection runners 312 are in communication with the second midsole mold chamber 320.

Step S8: injecting a second foaming material including a second supercritical fluid into the second midsole mold chamber 320 through the second injection runners 312, so as to foam and mold the second foaming material to form a second foamed midsole layer 12 in the second midsole mold chamber 320, and to integrally bond the second foamed midsole layer 12 to the first bottom surface 112 of the first foamed midsole layer 11. At this stage, the first foamed midsole layer 11 and the second foamed midsole layer 12 together form the foamed dual-layer midsole 10, thereby obtaining the shoe body 100. As shown in FIG. 7, in the current embodiment, when the second foaming material foams and molds to form the second foamed midsole layer 12, the second foamed midsole layer 12 is bonded to the first foamed midsole layer 11 by thermal fusion, without including an adhesive layer between the first foamed midsole layer 11 and the second foamed midsole layer 12. The second foamed midsole layer 12 is formed with a plurality of protrusions 123, which are respectively located within the through holes 33 of the outsole 30. The second foaming material is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof. The second supercritical fluid might be nitrogen or carbon dioxide, and an injection screw temperature of the second foaming material ranges from 100° C. to 300° C. In other embodiments, the first foaming material and the second foaming material might be the same type, so that the first foamed midsole layer 11 and the second foamed midsole layer 12 could be integrally bonded by thermal fusion, but the present disclosure is not limited thereto. In other embodiments, the first foaming material and the second foaming material might also be different type, and the first foamed midsole layer 11 and the second foamed midsole layer 12 could still be bonded to each other by thermal fusion.

In the current embodiment, setting a second gas pressure value within the second midsole mold chamber 320 before injecting the second foaming material into the second midsole mold chamber 320, with the second gas pressure value ranges from 0 to 40 bar. When the second gas pressure value is greater than 0, the second gas pressure within the second midsole mold chamber 320 is released after the injection of the second foaming material, allowing the second foaming material to foam and form the second foamed midsole layer 12 within the second midsole mold chamber 320. Preferably, the first gas pressure value ranges from 5 to 35 bar, but is not limited to this range. Opening the second midsole module 300 includes detaching the second mold cover 330 and the second midsole mold 310 from the upper mold 210 to release the constraint on the two clamping blocks 212. Therefore, the foamed dual-layer midsole 10 could be removed from the upper mold 210 together with the upper 20. Subsequently, the foamed dual-layer midsole 10 is trimmed to complete the shoe body 100.

Moreover, the steps of the method for manufacturing the shoe body with the foamed dual-layer midsole formed by supercritical foaming injection molding could be modified or supplemented as needed. For example, in other embodiments, an insert (not shown) is pre-disposed between the second midsole mold 310 and the upper mold 210 before sealing the second midsole mold 310 to the upper mold 210, wherein the insert is a carbon plate or a thermoplastic support plate. The thermoplastic support plate is selected from a group consisting of thermoplastic polyurethane elastomer (TPU), polyether block amide copolymer (PEBA), and a combination thereof. The insert is fixed in the second midsole mold chamber 320, and the second foaming material is injected into the second midsole mold chamber 320 to cover the insert. When the second foaming material foams to form the second foamed midsole layer 12, the insert might be fixed between the second foamed midsole layer 12 and the outsole 30, or between the second foamed midsole layer 12 and the first foamed midsole layer 11, thereby enhancing the walking support of the foamed dual-layer midsole 10, but not limited thereto.

The method for manufacturing the shoe body with the foamed dual-layer midsole formed by supercritical foaming injection molding adopts a two-stage supercritical foaming injection process. First, the first foamed midsole layer 11 is formed by injection molding using the first midsole module 200, and the first foamed midsole layer 11 is directly bonded to the upper 20. Subsequently, the first midsole mold 220 of the first midsole module 200 is replaced with the second midsole mold 310 of the second midsole module 300, which is sealable to the upper mold 210. The second foaming material is then injected into the second midsole mold chamber 320 to form the second foamed midsole layer 12. The first foamed midsole layer 11 and the second foamed midsole layer 12 could be integrally bonded to form the foamed dual-layer midsole 10. Thereby reducing a number of mold setups and changes, saving adhesive application and bonding steps and costs, and improving overall process efficiency.

As shown in FIG. 8, the shoe body 100 with the foamed dual-layer midsole 10 formed by supercritical foaming injection molding, according to another embodiment in of the present invention, is provided and obtained using the method described in the foregoing embodiment. The shoe body 100 includes the foamed dual-layer midsole 10, the upper 20, and the outsole 30. The foamed dual-layer midsole 10 is bonded between the upper 20 and the outsole 30.

The foamed dual-layer midsole 10 includes the first foamed midsole layer 11 and the second foamed midsole layer 12. The first foamed midsole layer 11 includes a first top surface 111 and a first bottom surface 112. The second foamed midsole layer 12 includes a second top surface 121 and a second bottom surface 122. The second top surface 121 is bonded to the first bottom surface 112. The first foamed midsole layer 11 is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof. The second foamed midsole layer 12 is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof. A density of the first foamed midsole layer 11 ranges from 0.1 to 0.3 g/cm$^3$, and a density of the second foamed midsole layer 12 ranges from 0.1 to 0.3 g/cm$^3$. Preferably, the density and a hardness of the first foamed midsole layer 11 and the density and a hardness of the second foamed midsole layer 12 could be adjusted to be the same as each other as needed, but are not limited thereto. In other embodiments, the density and the hardness of the first foamed midsole layer 11 and the density and the hardness of the second foamed midsole layer 12 could be adjusted to be differ from each other as needed. For example, the hardness of the second foamed midsole layer 12 is greater than the hardness of the first foamed midsole layer 11.

The upper 20 is bonded to the foamed dual-layer midsole 10. The upper 20 includes the bottom surface 21 that is bonded to the first top surface 111 of the first foamed midsole layer 11. The first top surface 111 of the first foamed midsole layer 11 is bonded to the bottom surface 21 of the upper 20 by thermal fusion, without including the adhesive layer between the first foamed midsole layer 11 and the upper 20. The first bottom surface 112 of the first foamed midsole layer 11 is bonded to the second top surface 121 of the second foamed midsole layer 12 by thermal fusion, without including the adhesive layer between first foamed midsole layer 11 and the second foamed midsole layer 12.

The outsole 30 is bonded to the foamed dual-layer midsole 10. The outsole 30 includes a third top surface 31 and a third bottom surface 32. The through holes 33 are disposed on the outsole 30 and penetrate the third top surface 31 and the third bottom surface 32. The second bottom surface 122 of the second foamed midsole layer 12 includes the protrusions 123, which are respectively located within the through holes 33 of the outsole 30, but are not limited thereto. In other embodiments, the outsole 30 could be omitted, as long as the shoe body 100 includes the foamed dual-layer midsole 10 and the upper 20. In other embodiments, the through holes 33 of the outsole 30 could be omitted, as long as the outsole 30 is integrally bonded to the foamed dual-layer midsole 10.

In the shoe body 100 with the foamed dual-layer midsole 10 formed by supercritical foaming injection molding, the foamed dual-layer midsole 10 is bonded to the upper 20. The foamed dual-layer midsole 10 is formed as an integral structure, with no adhesive layer between the first foamed midsole layer 11 and the upper 20, or between the first foamed midsole layer 11 and the second foamed midsole layer 12, thereby enhancing the structural strength of the shoe body 100. The first foamed midsole layer 11 and the second foamed midsole layer 12 could be designed with different densities, colors, hardness levels, and materials according to specific requirements, allowing their physical and functional properties to be interchangeably configured for various applications, while also enhancing the overall aesthetic appearance of the foamed dual-layer midsole 10.

It must be pointed out that the embodiment described above is only a preferred embodiment of the present invention. All equivalent composites and methods which employ the concepts disclosed in this specification and the appended claims should fall within the scope of the present invention.

What is claimed is:

1. A method for manufacturing a shoe body with a foamed dual-layer midsole formed by supercritical foaming injection molding, wherein the shoe body comprises the foamed dual-layer midsole and an upper bonded to each other; the method comprising the steps of:

step S1: providing a first midsole module, wherein the first midsole module comprises an upper mold and a first midsole mold; the upper mold comprises an upper mold cavity, wherein the upper, sleeved onto a shoe last, is pre-disposed in the upper mold cavity; the first midsole mold comprises a first midsole mold cavity and a plurality of first injection runners, wherein the first injection runners are connected to the first midsole mold cavity;

step S2: sealing the first midsole mold to the upper mold to form a first midsole mold chamber defined by the upper mold cavity and the first midsole mold cavity, wherein the first injection runners are in communication with the first midsole mold chamber;

step S3: injecting a first foaming material comprising a first supercritical fluid into the first midsole mold chamber through the first injection runners, so as to foam and mold the first foaming material to form a first foamed midsole layer, and to integrally bond the first foamed midsole layer to the upper;

step S4: opening the upper mold and the first midsole mold, with the first foamed midsole layer and the upper remaining on the upper mold; a first bottom surface of the first foamed midsole layer comprises a plurality of foamed columns, wherein the foamed columns correspond to a plurality of positions of the first injection runners and are exposed from the upper mold cavity;

step S5: trimming the first bottom surface of the first foamed midsole layer to remove the foamed columns on the first bottom surface;

step S6: providing a second midsole module comprising a second midsole mold, wherein the second midsole mold comprises a second midsole mold cavity and a plurality of second injection runners, and the second injection runners are connected to the second midsole mold cavity;

step S7: sealing the second midsole mold to the upper mold, with the first foamed midsole layer disposed on the upper mold, to form a second midsole mold chamber between the first foamed midsole layer and the second midsole mold cavity, wherein the second injection runners are in communication with the second midsole mold chamber; and step S8: injecting a second foaming material comprising a second supercritical fluid into the second midsole mold chamber through the second injection runners, so as to foam and mold the second foaming material to form a second foamed midsole layer, and to integrally bond the second foamed midsole layer to the first bottom surface of the first foamed midsole layer; the first foamed midsole layer and the second foamed midsole layer together form the foamed dual-layer midsole, thereby obtaining the shoe body.

2. The method as claimed in claim 1, wherein the upper mold comprises two clamping blocks disposed on the upper mold; when the upper, sleeved onto the shoe last, is disposed on the upper mold, the two clamping blocks are relatively movable and contact two sides of a bottom surface of the upper; the upper mold cavity is located between the two clamping blocks.

3. The method as claimed in claim 2, wherein the first midsole module comprises a first mold cover comprising a plurality of first feeding holes; sealing the first midsole mold to the upper mold comprises: first disposing the first midsole mold on the two clamping blocks, then placing the first mold cover over a periphery of the first midsole mold and a periphery of the two clamping blocks, and finally sealing the first mold cover to the upper mold; the first feeding holes are in communication with the first injection runners of the first midsole mold.

4. The method as claimed in claim 1, wherein when the first foaming material foams and molds to form the first foamed midsole layer in the first midsole mold chamber, the first foamed midsole layer is bonded to the upper by thermal fusion, without an adhesive layer being provided between the first foamed midsole layer and the upper.

5. The method as claimed in claim 2, wherein the second midsole module comprises a second mold cover comprising a plurality of second feeding holes; sealing the second midsole mold to the upper mold comprises: first disposing the second midsole mold on the two clamping blocks, then placing the second mold cover over a periphery of the second midsole mold and a periphery of the two clamping blocks, and finally sealing the second mold cover to the upper mold; the second feeding holes are in communication with the second injection runners of the second midsole mold.

6. The method as claimed in claim 1, wherein when the second foaming material foams and molds to form the second foamed midsole layer in the second midsole mold chamber, the second foamed midsole layer is bonded to the first bottom surface of the first foamed midsole layer by thermal fusion, without an adhesive layer being provided between the first foamed midsole layer and the second foamed midsole layer.

7. The method as claimed in claim 1, wherein an outsole is pre-disposed in the second midsole mold cavity of the second midsole mold; when the second midsole mold is sealed to the upper mold, the outsole faces the first bottom surface of the first foamed midsole layer; the second midsole mold chamber is located between the outsole and the first foamed midsole layer.

8. The method as claimed in claim 7, wherein a plurality of protruding tubes are disposed within the second midsole mold cavity, and protrude at a plurality of positions corresponding to the second injection runners; a plurality of through holes are disposed on the outsole and are respectively sleeved onto the protruding tubes; when the second foamed midsole layer is formed in the second midsole mold chamber, the second foamed midsole layer is formed with a plurality of protrusions, which are respectively located within the through holes of the outsole.

9. The method as claimed in claim 7, wherein an insert is pre-disposed between the second midsole mold and the upper mold before sealing the second midsole mold to the upper mold; the insert is fixed in the second midsole mold chamber, and the second foaming material is injected into the second midsole mold chamber to cover the insert.

10. The method as claimed in claim 9, wherein the insert is a carbon plate or a thermoplastic support plate; the thermoplastic support plate is selected from a group consisting of thermoplastic polyurethane elastomer (TPU), polyether block amide copolymer (PEBA), and a combination thereof.

11. The method as claimed in claim 1, wherein the first foaming material is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof; an injection screw temperature of the first foaming material ranges from 100° C. to 300° C.

12. The method as claimed in claim 1, wherein setting a first gas pressure value within the first midsole mold chamber before injecting the first foaming material into the first midsole mold chamber, with the first gas pressure value ranges from 0 to 40 bar; the first supercritical fluid is nitrogen or carbon dioxide.

13. The method as claimed in claim 1, wherein the second foaming material is selected from a group consisting of ethylene-vinyl acetate copolymer (EVA), polyolefin elastomer (POE), styrene-ethylene/butylene-styrene copolymer (SEBS), thermoplastic polyurethane elastomer (TPU), thermoplastic polyester elastomer (TPEE), polyether block amide copolymer (PEBA), and a combination thereof; an injection screw temperature of the second foaming material ranges from 100° C. to 300° C.

14. The method as claimed in claim 1, wherein setting a second gas pressure value within the second midsole mold chamber before injecting the second foaming material into the second midsole mold chamber, with the second gas pressure value ranges from 0 to 40 bar;

the second supercritical fluid is nitrogen or carbon dioxide.

* * * * *